United States Patent [19]

Hillig

[11] Patent Number: 4,725,567
[45] Date of Patent: Feb. 16, 1988

[54] COMPOSITE BY INFILTRATION

[75] Inventor: William B. Hillig, Saratoga, N.Y.

[73] Assignee: General Electric Company, Schenectady, N.Y.

[21] Appl. No.: 803,172

[22] Filed: Dec. 2, 1985

[51] Int. Cl.[4] .................. C04B 35/52; C04B 35/58; C04B 35/16

[52] U.S. Cl. ..................... 501/87; 501/88; 501/89; 501/96; 501/97; 501/98; 264/65

[58] Field of Search ................ 264/65; 501/32, 87, 501/88, 89, 96, 97, 98

[56] References Cited

U.S. PATENT DOCUMENTS

| | | | |
|---|---|---|---|
| 4,279,654 | 7/1981 | Yajima et al. | 51/307 |
| 4,464,192 | 8/1984 | Layden et al. | 501/95 |
| 4,464,475 | 8/1984 | Beall et al. | 501/9 |
| 4,485,179 | 11/1984 | Brennan et al. | 501/95 |
| 4,524,100 | 6/1985 | Shimizu et al. | 428/283 |
| 4,542,109 | 9/1985 | Pasto | 501/97 |
| 4,543,345 | 9/1985 | Wei | 501/95 |

OTHER PUBLICATIONS

Aveston, J., "Strength and Toughness in Fibre Reinforced Ceramics", The Properties of Fibre Composites, National Physical Laboratory Conference, Nov. 4, 1971, front summary page and pp. 3 & 7.

Primary Examiner—Mark L. Bell
Attorney, Agent, or Firm—Jane M. Binkowski; James C. Davis; Paul R. Webb, II

[57] ABSTRACT

A composite is produced by shaping a ceramic filler into a porous compact and infiltrating the compact with liquid alkaline earth silicate or alkaline earth aluminosilicate.

39 Claims, 2 Drawing Figures

COMPOSITE BY INFILTRATION

This invention relates to the production of a ceramic composite by forming a porous compact of a ceramic filler and infiltrating its pores with molten alkaline earth silicate or alkaline earth aluminosilicate.

One of the limitations in making ceramic matrix composites is how to introduce the matrix phase in a way that avoids excessive porosity due to shrinkage during processing. This is particularly a problem where the filler or reinforcing phase is filamental or plate-like. Sintering, or sol-gel processes result in large shrinkage away from the reinforcing phase and, therefore, are not satisfactory procedures. Glass or crystallizable glass as the matrix overcomes this problem, and has been successfully used to make composites. However, such a matrix has the problem of a relatively limited upper service temperature because of softening of the relatively large amount of residual glass, or dissolution of the crystalline phases. Thus, 1100° C. is generally the maximum use temperature.

The present solution to finding a suitable ceramic matrix and associated process capable of service to much higher temperatures is through the use of molten alkaline earth silicate or aluminosilicate having a solidus temperature in excess of the proposed use temperature. A matrix composition corresponding to a congruently melting silicate or aluminosilicate is preferable. Departures from such composition would result in the formation of liquid at the solidus temperature which lies below the congruent melting temperature, decreasing the upper use temperature accordingly.

$CaSiO_3$ having a melting point of 1530° C., is a desirable matrix material. It forms anisotropic crystals which upon fracture tend to produce sliver-like fragments. Hence, this material has been utilized as an asbestos substitute.

One of the problems with oxide melts is that they generally exhibit volumetric shrinkage upon solidification. However, $SrSiO_3$ is reported by D. A. Buechner and R. Roy, J. Am. Cer. Soc. 43, 52 (1960) to exhibit the unusual property of expansion upon freezing (like water, bismuth, and silicon). Furthermore, $SrSiO_3$ (melting point = 1580° C.) is isomorphous with the high temperature form of $CaSiO_3$ (pseudowallastonite) with which it forms a continuous range of solid solutions. Thus, by mixing these two silicates, a composition presumably exists which has zero shrinkage on solidification. Further, the addition of $SrSiO_3$ to $CaSiO_3$ stabilizes the latter against transformation to the low temperature modification. Both $SrSiO_3$ and the solid solution of $CaSiO_3$ and $SrSiO_3$ fracture in a similar mode to $CaSiO_3$.

Briefly stated, the present process for producing a composite having a porosity of less than about 10% by volume comprises forming a ceramic filler into a compact, said compact having an open porosity ranging from about 30% by volume to about 95% by volume of the compact, contacting said compact with an infiltrant selected from the group consisting of barium silicate, barium aluminosilicate, calcium silicate, calcium aluminosilicate, magnesium silicate, magnesium aluminosilicate, strontium silicate, strontium aluminosilicate and mixtures thereof, heating the resulting structure to an infiltration temperature ranging from the liquidus temperature of said infiltrant to below the temperature at which there is significant vaporization of said infiltrant and infiltrating the resulting liquid infiltrant into said compact to produce said composite, said process being carried out in an atmosphere or vacuum which has no significant deleterious effect thereon and in which there is no significant reaction between said ceramic filler and said infiltrant.

Briefly stated, the present composite has a porosity of less than 10% by volume and is comprised of a ceramic filler phase ranging in amount from about 5% by volume to about 70% by volume of said composite, and a continuous polycrystalline matrix phase selected from the group consisting of barium silicate, barium aluminosilicate, calcium silicate, calcium aluminosilicate, magnesium silicate, magnesium aluminosilicate, strontium silicate, strontium aluminosilicate and mixtures and/or solid solutions thereof, said polycrystalline matrix phase ranging in amount from about 30% by volume to about 95% by volume of the composite.

Those skilled in the art will gain a further and better understanding of the present invention from the detailed description set forth below, considered in conjunction with the figures accompanying and forming a part of the specification, in which.

Figure 1:
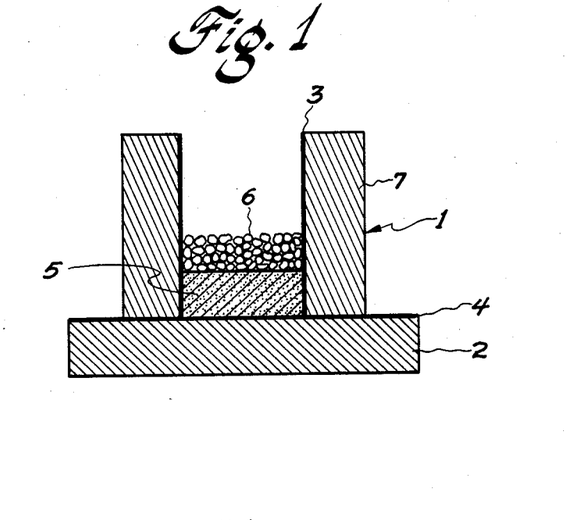
FIG. 1 is a sectional view through a structure showing an embodiment for carrying out the present process.

FIG. 1 is a cross section of a structure 1 which illustrates one embodiment of the present process prior to infiltration. Graphite cylinder 7 and graphite base 2 have a coating of boron nitride 4 and 3 to prevent any sticking and facilitate removal of the resulting composite. Porous compact 5 is comprised of a cold-pressed powder of the ceramic filler. A layer of granules of infiltrant 6 is shown in contact with compact 5 and covers its entire top surface.

Figure 2:
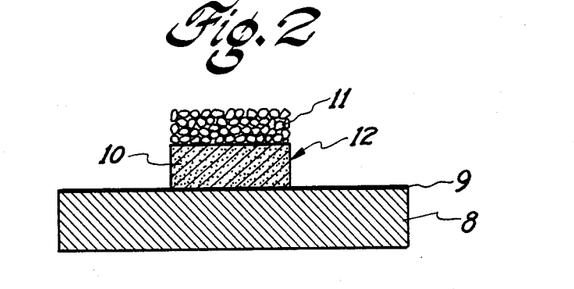
FIG. 2 is a sectional view through another structure showing another embodiment for carrying out the present process.

FIG. 2 shows a cross section of a free standing assembly 12 of a layer of granules of infiltrant 11 in contact with the upper surface of porous compact 10 comprised of ceramic filler powder. Assembly 12 is set on graphite base 8 having a boron nitride coating 9 to prevent sticking.

Graphite cylinder 7 and bases 2 and 8 are a convenience and are not required for carrying out the present process. However, structures chemically inert to the ceramic filler and infiltrant such as graphite cylinder 7 and base 2 provide greater precision in the making of a finished product and also provide better control of the amount of infiltrant which is needed to penetrate the compact.

The present ceramic filler is a polycrystalline inorganic material which is a solid at processing temperature. Specifically, the ceramic filler of the composite has the characteristics of being stable at the temperatures necessary for processing or it is not significantly affected by the processing temperatures. In the present process, the ceramic filler is sufficiently inert so that no significant reaction, and preferably no reaction detectable by scanning electron microscope, occurs between it and the infiltrant. Also, the ceramic filler is at least sufficiently wettable by the infiltrant to allow the present infiltration to occur by capillarity. Preferably, the infiltrant has a contact or wetting angle against the filler of less than 90° C. The present process has no significant effect on the ceramic filler. Generally, the filler functions as a reinforcing, toughening, matrix grain size controlling material and/or abrasion resisting material.

The particular ceramic filler or mixture of fillers used depends largely on the particular properties desired in the composite. Preferably, the ceramic filler is a carbide, nitride, boride, silicide or other similar ceramic refractory material. Ceramic oxides are not useful as fillers in the present invention.

Representative of ceramic carbides useful in the present process is the carbide of boron, chromium, hafnium, niobium, silicon, tantalum, titanium, vanadium, zirconium, and mixtures and solid solutions thereof. For example, the useful carbides includes $B_4C$, $Cr_3C_2$, HfC, NbC, SiC, TaC, TiC, VC and ZrC.

Representative of the ceramic nitrides useful in the present process is the nitride of hafnium, niobium, silicon, tantalum, titanium, vanadium, zirconium, and mixtures and solid solutions thereof. For example, the useful nitrides include HfN, NbN, $Si_3N_4$, TaN, TiN, VN and ZrN.

Examples of ceramic borides are the borides of hafnium, niobium, tantalum, titanium, vanadium, zirconium, and mixtures and solid solutions thereof. More specifically, representative of the useful borides are $HfB_2$, NbB, $NbB_2$, TaB, $TaB_2$, $TiB_2$, VB, $VB_2$ and $ZrB_2$. Examples of useful silicides are $TaSi_2$, $MoSi_2$ and $WSi_2$.

The filler can be in any desired form such as, for example, a powder or filament or mixtures thereof. Generally, when the filler is in the form of a powder, it is characterized by a mean particle size which generally ranges from about 0.1 micron to about 1000 microns, preferably from about 0.2 micron to about 100 microns, and more preferably from about 0.5 micron to about 25 microns.

In one embodiment of the present invention, to produce a compact of particular porosity, or of high density, or a composite of particular microstructure, a particle size distribution of filler powder can be used with fractions of coarse or coarser particles being admixed with fractions of fine or finer particles so that the fine particles fit into the voids between the large particles and improve packing. Optimum distribution is determinable empirically.

As used herein, filament includes a whisker, discontinuous fiber or continuous fiber of filler. Generally, the discontinuous filaments have an aspect ratio of at least 10, and in one embodiment of the present invention it is higher than 50, and yet in another embodiment it is higher than 1000. Generally, the lower their aspect ratio, the higher is the packing which can be achieved in the compact since the small fibers intertwine or interlock. Also, generally, the higher the aspect ratio of the discontinuous fiber for a given volume fraction of filament, the better are the mechanical properties of the compact. In cases where the filaments are continuous in length, a large packing fraction is possible, for example, by arranging them in parallel or weaving them into cloth. Generally, the filament ranges from about 0.1 micron to about 20 microns in diameter and from about 10 microns to about 10 centimeters in length.

The filaments are used to impart desirable characteristics to the composite, such as improved stiffness strength, and toughness. In general, the greater the packing density of filaments, the greater is the improvement of such properties. Also, fibers with large aspect ratios usually are more effective in producing such improvement than are fibers having small aspect ratios.

In one embodiment of the present invention, the filler in the compact and in the composite is comprised of, or contains in an amount of at least 5% by volume of the filler, filaments with an aspect ratio higher than about 250 and at least about 10% by volume of these filaments are aligned in at least a significantly unidirectional alignment.

In another embodiment of the present invention, the filler in the compact and in the composite is comprised of randomly oriented filaments having an aspect ratio of less than about 50.

In yet another embodiment of the invention, the filler in the compact and in the composite is comprised of filaments having an aspect ratio of less than about 50, and at least about 10% by volume of the filaments are randomly oriented in substantially a single plane and the balance of the filaments are randomly oriented.

In one embodiment of the present process, a mixture of filler powder and filaments is used to produce a compact of desired porosity, mechanical strength or a composite of desired microstructure. The particular desired mixture of powder and filaments is determinable empirically.

A mixture of ceramic filler powders or filaments of distributed size or a mixture of powder and filaments can be produced by a number of conventional techniques. For example, fractions of filler powders of distributed size or powder and filaments can be admixed in water under ambient conditions using, for example, a propeller blender, and the resulting dispersion can be dried in air at ambient temperature.

The ceramic filler can be formed into a compact, i.e. preform or green body, of desired shape and size by a number of conventional techniques. For example, the filler can be extruded, injection molded, die pressed, isostatically pressed or slip cast to produce the desired compact. Any lubricants, binders or similar materials used in shaping the compact should have no significant deleterious effect on the resulting composite. Such materials are preferably of the type which evaporate or burn off on heating at relatively low temperatures, preferably below 500° C., leaving no significant residue.

In one embodiment of the present invention, when a significant amount of large sized filaments is used which are difficult to compact, or when a highly porous compact is to be produced, a solution or slurry of a strength imparting agent preferably is admixed with the filler and the mixture dried leaving a coating or residue of the strength imparting agent on the filler in an amount sufficient to impart to the resulting compact any mechanical strength which may be required prior to or during the present infiltration. The strength imparting agent should have no significant deleterious effect on the resulting composite and its occurrence as a new discrete phase in the resulting composite preferably is less than about 1% by volume, and more preferably less than 0.5% by volume, of the composite. Preferably, an aqueous slurry of alumina is used and in such instance the alumina residue in the compact dissolves in the infiltrant during infiltration which may or may not produce a discrete phase of alumina in the resulting composite.

Preferably, the compact is formed into the shape and has the dimensions required of the composite. This allows the production of a composite of predetermined shape and size. The compact can be in any form desired, such as, for example, it can be hollow and/or of simple shape and/or of complex shape. The terms compact or preform refer to a non-sintered body prefered for infiltration later by the molten matrix material.

The present compact has a particle or filament size, or a ratio of filaments and powder which is predetermined by the particular microstructure desired in the resulting composite.

The open porosity of the compact ranges from about 30% by volume to about 95% by volume, and preferably from about 35% by volume to about 75% by volume, of the compact. The open porosity of the compact depends mostly on the composition desired in the resulting composite, i.e., the open porosity of the compact corresponds to the maximum volume fraction of matrix phase attainable in the composite. Specifically, to produce a composite containing the matrix phase in an amount ranging from about 30% by volume to about 95% by volume of the composite, the compact should have an open porosity ranging from about 30% by volume to about 95% by volume of the compact.

By open porosity of the compact or body herein, it is meant pores or voids which are open to the surface of the compact or body thereby making the interior surfaces accessible to the ambient atmosphere.

Generally, the present compact has no closed porosity. By closed porosity it is meant herein closed pores or voids, i.e. pores not open to the surface of the compact or body and therefore not in contact with the ambient atmosphere.

Void or pore content, i.e. both open and closed porosity, can be determined by standard physical and metallographic techniques.

Preferably, the pores in the compact are small, preferably between about 0.1 micron and about 10 microns, and at least significantly or substantially uniformly distributed through the compact thereby enabling the production of a composite wherein the matrix phase is at least significantly or substantially uniformly distributed.

In the present process, the infiltrant is selected from the group consisting of barium silicate, barium aluminosilicate, calcium silicate, calcium aluminosilicate, magnesium silicate, magnesium aluminosilicate, strontium silicate, strontium aluminosilicate and mixtures thereof.

The present alkaline earth silicate can be represented as $BaSiO_3$, $CaSiO_3$, $MgSiO_3$, $SrSiO_3$, $2BaO.SiO_2$, $2BaO.3SiO_2$, $BaO.2SiO_2$, $2CaO.SiO_2 3CaO.2SiO_2$, $2MgO.SiO_2$ and $2SrO.SiO_2$, wherein each oxidic constituent can vary from the stoichiometric formula. The present alkaline earth silicate can also be represented in terms of its oxidic constituents, i.e. MO and $SiO_2$, by the general formula $xMO.zSiO_2$ where M=Ba, Ca, Mg, Sr and mixtures thereof, and where x is 1, 2 or 3 and z is 1, 2 or 3. Each oxidic constituent in such stoichiometric formula can range up to ±50%, preferably less than ±10%, from its stoichiometric composition.

The present alkaline earth aluminosilicate can be represented a $BaO.Al_2O_3.2 SiO_2$, $2 CaO.Al_2O_3.SiO_2$, $CaO.Al_2O_3.2 SiO_2$, $2 MgO.2 Al_2O_3.5 SiO_2$, $4 MgO.5 AL_2O_3.2 SiO_2$, $SrO.Al_2O_3.SiO_2$, $2 SrO.Al_2O_3.SiO_2$ and $6 SrO.9 Al_2O_3.2 SiO_2$ wherein each oxidic constituent can vary from the stoichiometric formula. The present alkaline earth aluminosilicate can also be represented in terms of its oxidic constituents, i.e. M', $Al_2O_3$ and $SiO_2$, by the general formula $xM'O.yAl_2O_3.zSiO_2$ where M'=Ba, Ca, Mg, Sr and mixtures thereof, where x is 1, 2, 4 or 6, y is 1, 2, 5 or 9 and z is 1, 2 or 5. Each oxidic constituent in such stoichiometric formula can range up to ±50%, preferably less than ±10%, from its stoichiometric composition.

Specifically, the present infiltrant has a liquidus temperature ranging from about 1250° C. to about 1850° C., and preferably from about 1400° C. to about 1700 ° C. By liquidus temperature herein, it is meant the temperature at which melting of the silicate or aluminosilicate is complete on heating.

In carrying out the present process, the infiltrant is placed in contact with the compact and such contact can be in a number of forms. Preferably, to inhibit its vaporization during infiltration, infiltrant powder is compacted into a pressed powder form or it is used in the form of large granules. Preferably, a layer of infiltrant is deposited on as large as possible a surface area of the compact to promote infiltration. In one embodiment of the present invention, an aqueous slurry of infiltrant powder is coated on the surface of the compact and dried leaving a coating, preferably a continuous coating, of infiltrant.

Preferably, the amount of infiltrant in contact with or deposited on the compact is sufficient to infiltrant the compact to produce the present composite so that infiltration can be completed in a single step. However, if desired, the compact can be partially infiltrated and the infiltration repeated until the present composite is produced.

Should the filler certain desorbable material on its surface, the structure comprised of the infiltrant in contact with the compact preferably is heated initially to an elevated temperature below the melting point of the infiltrant, typically from about 800° C. to below the melting point of the infiltrant, for a period of time sufficient to degas the compact, typically for about 10 minutes. Degassing temperature and time are determinable empirically. Generally, such degassing is necessary when the filler has desorbable material on its surface, such as hydrogen chloride, which would lead to gas evolution during the infiltration causing gas pockets or gross porosity. The completion of degassing is indicated by the stabilization of the pressure in the furnace.

After degassing, if any, the temperature is increased to a temperature at which the infiltrant is liquid and the filler is solid to infiltrate the liquid infiltrant into the open pores of the compact. The infiltration temperature ranges from the liquidus temperature of the infiltrant up to a temperature at which no significant vaporization of the infiltrant occurs. Generally, with increasing infiltration temperature, the viscosity of the infiltrant decreases. At infiltration temperature, the infiltrant has a viscosity of less than about 50 poises, preferably less than about 5 poises, and more preferably less than about 1 poise. The particular infiltration temperature is determinable empirically, and typically it ranges from about 1300° C. to about 1900° C., but preferably from about 1350° C. to about 1750° C. Also preferably, to prevent significant vaporization of the infiltrant, infiltration is carried out at as low a temperature as possible, and preferably no higher than about 50° C. above the liquidus temperature of the infiltrant. To ensure infiltration of the compact, the entire compact should be above the liquidus temperature of the infiltrant during infiltration. Infiltration time can vary, but generally infiltration is completed within about an hour.

Generally, the heating rate up to below or just below the melting point of the infiltrant ranges up to about 100° C. per minute. Commencing just below the melting point of the infiltrant, i.e. preferably within about 15 degrees of the onset of the melting, the continuing to the maximum infiltration temperature, the heating rate preferably ranges from about 1° C. per minute to about 10° C., more preferably from about 1° C. per minute to about 5° C. per minute, to facilitate controlled infiltration of the liquid infiltrant into the porous compact. Overheating may cause significant vaporization of the infiltrant and may interfere with the present infiltration and also may cause undesirable deposition in the heating apparatus.

The present process is carried out in an atmosphere or vacuum in which the ceramic filler and infiltrant are inert or substantially inert, i.e., an atmosphere or vacuum which has no significant deleterious effect thereon. Specifically, the process atmosphere or vacuum should be one in which no significant reaction between the filler and infiltrant takes place. Reaction between the filler and infiltrant will degrade the mechanical properties of the resulting composite. Preferably, the process atmosphere or vacuum maintains the inertness of the filler so that no reaction between the filler and infiltrant takes place which is detectable by scanning electron microscopy. Also, the process atmosphere or vacuum should be non-oxidizing with respect to the ceramic filler. The particular process atmosphere or vacuum is determinable empirically and depends largely on the ceramic filler used. The process atmosphere or vacuum can be comprised of or contain nitrogen, a noble gas, preferably argon or helium, and mixtures thereof. However, when the filler is a ceramic carbide, the process atmosphere or vacuum preferably should contain at least a partial pressure of carbon monoxide determinable empirically or by thermodynamic calculation which is at least sufficient to prevent reaction or significant reaction between the carbide and infiltrant. Also, when the filler is a ceramic nitride, the process atmosphere or vacuum preferably should contain at least a partial pressure of nitrogen determinable empirically or by thermodynamic calculation which is at least sufficient to prevent reaction or significant reaction between the nitride and the infiltrant, and preferably the atmosphere is nitrogen.

Also, in the present process, it is usually beneficial to generate a partial pressure of silicon monoxide in situ by reaction of a silicate and reducing agent. The silicon monoxide is intended to suppress possible reaction between the infiltrant and ceramic filler.

The pressure of the process atmosphere or vacuum can vary widely and is determinable empirically or by thermodynamic calculations and depends largely on the dissociation and/or reaction pressures of the particular ceramic filler and infiltrant and the temperature required for infiltration. More specifically, the process atmosphere or vacuum can range from below to above ambient pressure, and preferably it is at ambient, i.e. atmospheric or about atmospheric. When the process atmosphere is at reduced pressure, typically it can range from about 0.1 torr up to ambient, and frequently, it ranges from about 100 torr to about 400 torr. When the process atmosphere is above ambient, it is convenient to restrict it to about 10 atmospheres.

When infiltration is completed, the infiltrated compact is allowed to solidify producing the present composite. The rate of cooling can vary and is not critical, but it should have no significant deleterious effect on the composite. Specifically, the infiltrated compact should be cooled at a rate which avoids cracking of the resulting composite, and this is determinable empirically depending largely on the geometry and size of the infiltrated compact. Generally, a cooling rate of less than about 50° C. per minute is useful for small bodies of simple shape and a cooling rate as great as about 20° C. per minute or higher is useful for large bodies of complex shape. Preferably, the infiltrated compact is cooled to ambient temperature prior to removal from the heating apparatus.

Any excess infiltrant on the surface of the composite can be removed by a number of techniques, such as, for example, by gentle scraping or abrading.

Preferably, the present composite does not contain any reaction product of ceramic filler and infiltrant which is detectable by scanning electron microscopy.

The present composite has a porosity of less than about 10% by volume, preferably less than about 5% by volume, more preferably less than 1% by volume, and most preferably, it is pore-free, i.e., it is fully dense.

The present composite is comprised of from about 5% by volume to about 70% by volume, preferably from about 25% by volume to about 65% by volume, of ceramic filler phase and from about 95% by volume to about 30% by volume, preferably from about 75% by volume to about 35% by volume, of continuous matrix phase. Generally, the composition of the continuous matrix phase is the same, substantially the same, or not significantly different from that of the infiltrant.

Specifically, the continuous matrix phase is comprised of an alkaline earth silicate selected from the group consisting of $BaSiO_3$, $CaSiO_3$, $MgSiO_3$, $SrSiO_3$, $2BaO.SiO_2$, $2BaO.3SiO_2$, $BaO.2SiO_2$, $2CaO.SiO_2$, $3CaO.2SiO_2$, $2MgO.SiO_2$, $2SrO.SiO_2$, and mixtures and/or solutions thereof wherein each oxidic constituent can vary from the stoichiometric formula. The alkaline earth silicate can also be represented in terms of its oxidic constituent by the general formula $xMO.zSiO_2$ where M=Ba, Ca, Mg, Sr and mixtures and/or solutions thereof, and where x is 1, 2 or 3 and z is 1, 2 or 3. Each oxidic constituent in such stoichiometric formula can range up to ±50%, but preferably less than ±10%, from its stoichiometric composition.

Also, the continuous matrix phase can be comprised of an alkaline earth aluminosilicate selected from the group consisting of $BaO.Al_2O_3.2\ SiO_2$, $2\ CaO.Al_2O_3.SiO_2$, $CaO.Al_2O_3.2\ SiO_2$, $2\ MgO.2\ Al_2O_3.5\ SiO_2$, $4\ MgO.5\ Al_2O_3.2\ SiO_2$, $SrO.Al_2O_3.2\ SiO_2$, $2\ SrO.Al_2O_3.SiO_2$, $6\ SrO.9\ Al_2O_3.2\ SiO_2$, and mixtures and/or solutions thereof wherein each oxidic constituent can vary from the stoichiometric formula. The alkaline earth aluminosiolicate can also be represented in terms of its oxidic constituents by the general formula $xM'_2O_3.zSiO_2$ where M'=Ba, Ca, Mg, Sr and mixtures and/or solution thereof, where x is 1, 2, 4 or 6, y is 1, 2, 5 and 9 and z is 1, 2 and 5. Each oxidic constituent in such stoichiometric formula can range up to ±50%, but preferably less than ±10%, from its stoichiometric composition.

Generally, in the present process, there is no significant loss of the components used to form the present composite.

Generally, in the present composite, the continuous matrix phase is distributed evenly or substantially evenly through the composite. In the present composite, the continuous matrix phase is interconnecting and generally envelops more than 25% by volume, preferably more than 50% by volume, of the individual filler members, i.e., particles and/or filaments.

The present composite can contain an amorphous glassy phase, generally in an amount of less than about 5% by volume, preferably less than about 2% by volume, and more preferably less than about 1% by volume, of the composite. Even more preferably, the present composite contains only a detectable amount of glassy phase. Ideally the composite would contain no glassy phase. The amount of glassy phase in the composite depends largely on the impurities in the starting materials.

The present invention makes it possible to fabricate a composite of the desired shape and size directly. For example, the present composite can be in the form of a flat body, a crucible, a hollow shaped article, a long rod, a gasket, or a wear resistant part such as a bushing. Since the present composite can be produced in a predetermined configuration of predetermined dimensions, it would require little or no machining.

The present composite has a number of uses. For example, it is useful as a high temperature structural material, as a vane, and as a wear resistant part such as a bushing.

The invention is further illustrated by the following examples where the procedure was as follows unless otherwise noted:

The alkaline earth silicates and alkaline earth aluminosilicates were of Reagent Grade.

Each preform was of disk shape of uniform or substantially uniform thickness. The thickness of the disk ranged from about 4 mm to about 6 mm.

Each preform had an open porosity of roughly about 50% by volume of the preform. The pores in the preform ranged from about 0.1 micron to about 10 microns.

All heating was carried out in a carbon resistance furnace contained in a vacuum bell jar system.

The enclosable carbon container was a dish with a cover.

In each example, a layer of alkaline earth silicate or alkaline earth aluminosilicate was placed on top of the preform as shown in FIG. 1 in a measured amount covering the entire top surface and was more than required to fill the open porosity of the preform.

In the examples, excess infiltrant was readily removed from each composite by gentle scraping and abrasion.

The total porosity of each composite was determined in a standard manner.

The composition of the alkaline earth silicate phase or alkaline earth aluminosilicate phase in the resulting composite did not differ significantly from that of the given infiltrant as determined by mass balance. Specifically, based on the fact that weight losses of the composites were generally less than 5% and in many cases less than 2%, it was concluded that no substantial change in the composition of the matrix occurred relative to that of the starting material, or that any significant reaction between the ceramic filler and the matrix occurred. In a number of cases, the fact that there was no reaction between the matrix and the ceramic filler was confirmed by scanning electron microscopy.

In each example, the furnace was heated to about forty degrees below the given infiltration temperature at the rate of 100° C./minute. The rate of heating was then decreased to 10° C./minute until the given infiltration temperature was reached. After the given time at infiltration temperature, the sample was furnace cooled to ambient temperature.

EXAMPLE 1

A preform of 2–5 micron silicon carbide powder was made at ambient temperature by die pressing about 15 grams of the powder moistened by a mixture of 2.4 ml of an 8 wt % colloidal suspension of CATAPAL hydrated aluminum oxide and 5 ml of methanol into a 34.5 mm diameter disk. The preform was placed on a carbon felt mat and covered with a layer of 12.65 grams of $CaSiO_3$ granules. The resulting structure was heated in carbon resistance furnace contained in a bell jar system in an atmosphere of nitrogen maintained at about 500 torr to about 1600° C. where it was held for about 30 minutes and then furnace cooled to ambient temperature.

Examination of the resulting present composite showed that infiltration of the $CaSiO_3$ into the preform occurred resulting in a dense composite having no measurable open porosity. Specifically, the composite was comprised of roughly equivalent amounts of polycrystalline silicon carbide phase and a continuous polycrystalline matrix phase which was distributed substantially evenly in the composite.

EXAMPLE 2

A 5.87 gram preform of 2–5 micron silicon carbide powder was made substantially in the same manner as disclosed in Example 1.

The preform was placed in an enclosable carbon container on a mixture of powders of BN, SiC and $SrO.Al_2O_3.2SiO_2$ to generate SiO in situ. The preform was covered with a layer of $MgSiO_3$ granules weighing 6.39 grams. The carbon container was then closed and placed in the carbon furnace where it and its contents were heated to 1560° C. for 15 minutes in a CO atmosphere at 120 torr and then furnace cooled to ambient temperature.

Examination of the resulting composite showed that it was fully infiltrated, i.e. it had no measurable open porosity. However, a bubble formed on the top surface.

The composite was comprised of roughly equivalent amounts of polycrystalline silicon carbide phase and a continuous polycrystalline matrix phase which was distributed substantially evenly in the composite. The total weight loss of the preform plus infiltrant material was 0.69 grams as a result of the infiltration process.

EXAMPLE 3

A 5.7 gram preform of 2–5 micron silicon carbide powder was made substantially in the same manner as disclosed in Example 1.

The preform was placed in an enclosable carbon container on a bed of mixed powders of BN, SiC, and $SrO.Al_2O_3.2SiO_2$ to generate SiO in situ.

The preform was covered with a layer of magnesium aluminosilicate granules having the composition $2MgO.2Al_2O_3.3SiO_2$. The carbon container was then closed and placed in the carbon furnace where it and its contents were heated in an atmosphere of CO and $N_2$ in the ratio of 1:3 respectively at a total pressure of 340 torr. The container and its contents were heated to 1600° C. where they were held for 15 minutes and then furnace cooled to ambient temperature.

The resultant composite was fully infiltrated and exhibited an open porosity of 1.5% by volume and a contraction of the preform diameter as a result of the infiltration of 0.3%.

EXAMPLE 4

9.97 grams of 2–5 micron silicon carbide powder was moistened with a 5 wt % solution of methyl methacrylate in acetone and pressed into a 34.5 mm diameter preform disk. After drying, 6 holes having a diameter of 2 mm were drilled through the disk spaced about 9 mm apart. The purpose of the holes was to demonstrate the ability of converting a complex preform shape into a composite, thereby avoiding or minimizing the need for later machining of the infiltrated composite structure. This preform was then placed in an enclosable carbon container. The bottom of the container was covered with a powder mixture comprised of SiC and BN. 11.69 grams of $SrSiO_3$ granules were placed on top of the preform. The container was then closed and placed in the carbon furnace were it was heated under a mixture of nitrogen at 80 torr and carbon monoxide at 120 torr. The container and its contents were heated to 1620° C. where they were held for 20 minutes prior to shutdown.

The resultant polycrystalline composite was fully infiltrated. The holes remained clean and well-defined. The overall diameter of the composite was 0.4% smaller than the initial preform, and exhibited an open porosity of less than 0.3% by volume. The preform plus infiltrant together decreased 0.34 gram in weight as a result of the infiltration process.

The composite was comprised of roughly equivalent amounts of polycrystalline silicon carbide phase and a continuous polycrystalline matrix phase which was distributed substantially evenly in the composite.

EXAMPLE 5

A 2.90 gram preform was pressed from a methanol moistened mixture consisting of 5 parts of 2-5 micron silicon carbide powder and 2 parts of silicon carbide rice-hull-derived whiskers. The preform was placed on a molybdenum support in an enclosable carbon container. A mixture of silicon carbide and silica sand covered the bottom of the container. A layer of granules of $SrO.Al_2O_3.2SiO_2$ weighing 3.89 grams was placed on the preform. The container was then closed and placed in the furnace where it and its contents were heated under a carbon monoxide atmosphere at 700 torr to 1725° C. where they were maintained for one hour and then furnace cooled.

The resultant composite was completely infiltrated and exhibited no detectable shrinkage ±0.1% after processing, nor any detectable open porosity ±0.1%. The combined weight of the preform plus the infiltrant decreased 0.03 grams as a result of the infiltration procedure.

The composite was comprised of roughly equivalent amounts of polycrystalline silicon carbide phase and a continuous polycrystalline matrix phase which was distributed substantially evenly in the composite.

EXAMPLE 6

A 3.2 gram preform was dry-pressed using 99% pure titanium nitride. The particle-size distribution of the titanium nitride ranged from about 1 micron to 400 microns. The preform was placed on a molybdenum support in an enclosable carbon container and covered with a layer of granules of $SrSiO_3$. The container was then closed and placed in the carbon furnace where it and its contents were heated under a nitrogen pressure of 500 torr to 1620° C. where they were maintained for 10 minutes and then furnace cooled.

The resulting composite was fully infiltrated, i.e. it had no measurable porosity. It was comprised of roughly equivalent amounts of polycrystalline titanium nitride phase and a continuous polycrystalline matrix phase which was distributed substantially evenly in the composite.

EXAMPLE 7

A 1.16 gram preform was pressed from a methanol-moistened mixture comprised of 10 wt % titanium diboride powder and 90 wt % of 2-5 micron silicon carbide powder. The titanium diboride powder was 99.8% pure and had a particle size range of 1-5 microns. The preform was placed on a molybdenum support in an enclosable carbon container. A mixture of silicon carbide and silicon dioxide sand covered the bottom of the container. The preform was covered with a layer of granules of $SrSiO_3$ weighing 1.22 grams. The container was then closed and placed in the furnace where it and its contents were heated under a carbon monoxide atmosphere of 300 torr to 1620° C. where they were held for 20 minutes and then furnace cooled.

The resultant composite was fully infiltrated with no detectable open porosity ±1%. The total weight of the preform plus infiltrant increased 0.08 gram as a result of the infiltration process. The composite was comprised of roughly about 50% by volume of a continuous polycrystalline matrix phase which was distributed substantially evenly in the composite. The remainder of the composite was comprised of polycrystalline phases of silicon carbide and titanium diboride.

EXAMPLE 8

A 1.26 gram preform was pressed from a methanol-moistened mixture comprised of 10 wt % of 1-5 micron titanium carbide powder and 90 wt % of 2-5 micron silicon carbide powder. The preform was placed on a molybdenum support in an enclosable carbon container. A mixture of SiC and $SiO_2$ powders covered the bottom of the container. The preform was covered with a layer of granules of $SrO.Al_2O_3.2SiO_2$ weighing 1.33 grams. The container was then closed and placed in the furnace where it and its contents were heated in an atmosphere of carbon monoxide at 600 torr pressure to 1720° C. where they were maintained for 20 minutes and then furnace cooled. The total weight loss of the preform and infiltrant was 0.12 grams.

The resultant composite was fully infiltrated with no detectable porosity ±1%. The composite was comprised of roughly about 50% by volume of a continuous polycrystalline matrix phase which was distributed substantially evenly in the composite. The remainder of the composite was comprised of polycrystalline phases of titanium carbide and silicon carbide.

Ser. No. 740,444, now U.S. Pat. No. 4,661,461, filed June 3, 1985, for COMPOSITE OF $Si_3N_4$ BY INFILTRATION by M. K. Brun and W. B. Hillig and assigned to the assignee hereof and incorporated herein by reference discloses a composite produced by infiltrating the open pores of a polycrystalline silicon nitride body with a member selected from the group consisting of barium fluoride, calcium fluoride, magnesium fluoride, strontium fluoride, cerium fluoride, dysprosium fluoride, gadolinium fluoride, lanthanum fluoride, samarium fluoride, yttrium fluoride and a mixture of said fluoride and a metal oxide.

Ser. No. 692,468, now abandoned, filed Jan. 18, 1985, for "COMPOSITE OF SiC and $CaF_2$ OR $MgF_2$ BY INFILTRATION" by W. B. Hillig and assigned to the assignee hereof and incorporated herein by reference discloses a composite of silicon carbide and calcium fluoride or magnesium fluoride produced by forming a porous compact of silicon carbide and infiltrating the pores of the compact with molten calcium fluoride or magnesium fluoride.

Ser. No. 759,815, now U.S. Pat. No. 4,636,480, filed July 29, 1985 for "COMPOSITE BY INFILTRATION" by W. B. Hillig and assigned to the assignee hereof and incorporated herein by reference discloses the production of a composite by forming a porous compact of a ceramic member selected from the group consisting of boron carbide, hafnium carbide, hafnium nitride, niobium carbide, niobium nitride, silicon carbide, silicon nitride, tantalum carbide, tantalum nitride, titanium carbide, titanium nitride, vanadium carbide, vanadium nitride, zirconium carbide and zirconium nitride, and infiltrating the compact with a member selected from the group consisting of barium fluoride, calcium fluoride, magnesium fluoride, strontium fluoride, cerium fluoride, dysprosium fluoride, gadolinium fluoride, lanthanum fluoride, samarium fluoride, yttrium fluoride, and a mixture of said fluoride with a metal oxide.

What is claimed is:

1. A process for producing a composite consisting essentially of from about 30% by volume to about 95% by volume of a continuous matrix phase and from about 5% by volume to about 70% by volume of a ceramic filler phase and having a porosity of less than about 10% by volume which consists essentially of forming a ceramic filler into a compact, said compact having an open porosity ranging from about 30% by volume to about 95% by volume of the compact, contacting said compact with an alkaline earth silicate and/or an alkaline earth aluminosilicate infiltrant selected from the group consisting of barium silicate, barium aluminosilicate, calcium silicate, calcium aluminosilicate, magnesium silicate, magnesium aluminosilicate, strontium silicate, strontium aluminosilicate, and a mixture thereof, heating the resulting structure to an infiltration temperature ranging from the liquidus temperature of said infiltrant to below the temperature at which there is significant vaporization of said infiltrant, infiltrating the resulting infiltrant into said compact to produce an infiltrated compact having the composition of said composite, and cooling said infiltrated compact producing said composite, said process being carried out in an atmosphere or vacuum in which there is no significant reaction between said ceramic filler and said infiltrant.

2. The process according to claim 1 wherein said alkaline earth silicate is represented by the stoichiometric formula $xMO.zSiO_2$ where M=Ba, Ca, Mg, Sr and a mixture thereof, where x is 1, 2 or 3 and z is 1, 2 or 3, and wherein each oxidic constituent of said stoichiometric formula ranges up to ±50% from its stoichiometric composition.

3. The process according to claim 1 wherein said alkaline earth aluminosilicate is represented by the stoichiometric formula $xM'O.yAl_2O_3.zSiO_2$, where M'=Ba, Ca, Mg, Sr and a mixture thereof, where x is 1, 2, 4 or 6, where y is 1, 2, 5 or 9, where z is 1, 2 or 5 and wherein each oxidic constituent of said stoichiometric formula ranges up to ±50% from its stoichiometric composition.

4. The process according to claim 1 wherein said ceramic filler is a ceramic carbide selected from the group consisting of boron carbide, hafnium carbide, niobium carbide, silicon carbide, tantalum carbide, titanium carbide, vanadium carbide, zirconium carbide and a mixture thereof.

5. The process according to claim 1 wherein said ceramic filler is a ceramic nitride selected from the group consisting of hafnium nitride, niobium nitride, silicon nitride, tantalum nitride, titanium nitride, vanadium nitride, zirconium nitride and a mixture thereof.

6. The process according to claim 1 wherein said composite is comprised of from about 35% by volume to about 75% by volume of continuous alkaline earth silicate or aluminosilicate phase and about 25% by volume to about 65% by volume of ceramic filler phase and wherein said compact has an open porosity ranging from about 35% by volume to about 75% by volume of said compact.

7. The process according to claim 1 wherein said ceramic filler is comprised of particles.

8. The process according to claim 1 wherein said ceramic filler is comprised of filaments.

9. The process according to claim 1 wherein said ceramic filler is comprised of a mixture of particles and filaments.

10. The process according to claim 1 wherein said infiltration temperature ranges from about 1300° C. to about 1900° C.

11. The process according to claim 1 wherein said calcium silicate is $CaO.SiO_2$ wherein each oxidic constituent of said $CaO.SiO_2$ ranges up to ±50% from its stoichiometric composition.

12. The process according to claim 1 wherein said strontium silicate is $SrO.SiO_2$ wherein each oxidic constituent of said $SrO.SiO_2$ ranges up to ±50% from its stoichiometric composition.

13. The process according to claim 1 wherein said strontium aluminosilicate is $SrO.Al_2O_3.2SiO_2$ wherein each oxidic constituent of said $SrO.Al_2O_32SiO_2$ ranges up to ±50% from its stoichiometric composition.

14. A process for producing a composite consisting essentially of from abou 30% by volume to about 95% by volume of a continuous matrix phase and from about 5% by volume to about 70% by volume of a ceramic filler phase and having a porosity of less than about 10% by volume which consists essentially of forming a ceramic filler into a compact, said compact having an open porosity ranging from about 30% by volume to about 95% by volume of the compact, contacting said compact with an alkaline earth silicate and/or an alkaline earth aluminosilicate infiltrant selected from the group consisting of barium silicate, barium aluminosilicate, calcium silicate, calcium aluminosilicate, magnesium silicate, magnesium aluminosilicate, strontium silicate, strontium aluminosilicate, and a mixture thereof, heating and resulting structure to a temperature ranging from about 800° C. to below the melting point of said infiltrant for a time sufficient to degas any desorbable material from said ceramic filler, heating the resulting desorbed structure to an infiltration temperature ranging from the liquidus temperature of said infiltrant to below the temperature at which there is significant vaporization of said infiltrant, infiltrating the resulting liquid infiltrant into said compact to produce an infiltrated compact having the composition of said composite, and cooling said infiltrated compact producing said composite, said process being carried out in an atmosphere or vacuum in which there is no significant reaction between said ceramic filler and said infiltrant.

15. The process according to claim 14 wherein said infiltration temperature ranges from about 1300° C. to about 1900° C.

16. The process according to claim 14 wherein said infiltrant is $CaO.SiO_2$ wherein each oxidic constituent of said $CaO.SiO_2$ ranges up to ±50% from its stoichiometric composition.

17. The process according to claim 14 wherein said infiltrant is $SrO.SiO_2$ wherein each oxidic constituent of said $Sr.SiO_2$ ranges up to ±50% from its stoichiometric composition.

18. The process according to claim 14 wherein said infiltrant is $SrO.Al_2O_3.2SiO_2$ wherein each oxidic constituent of said $SrO.Al_2O_3.2SiO_2$ ranges up to ±50% from its stoichiometric composition.

19. A composite having a porosity of less than about 10% by volume consisting essentially of polycrystalline inorganic filler ranging in amount from about 5% by volume to about 70% by volume of said composite, said filler being free of oxide filler, and a continuous interconnecting polycrystalline alkaline earth silicate matrix phase ranging in amount from about 95% by volume to about 30% by volume of said composite, said matrix phase being distributed through said composite, the thickness of said matrix phase between said filler ranging from about 0.1 micron to about 10 microns, said filler being free of oxide filler, said alkaline earth silicate phase being represented by the stoichiometric formula $xMO.zSiO_2$ where M=Ba, Ca, Mg, Sr and a mixture and/or solid solution thereof, where x is 1, 2 or 3 and z is 1, 2 or 3, and wherein said MO and $SiO_2$ constituent of said stoichiometric formula ranges less than ±10% from said stoichiometric formula, said composite containing an amorphous glassy phase in an amount of less than about 5% by volume of said composite, said composite containing no significant reaction product of said filler and said matrix phase.

20. The composite according to claim 19 wherein said ceramic filler phase is comprised of a ceramic carbide selected from the group consisting of boron carbide, hafnium carbide, niobium carbide, silicon carbide, tantalum carbide, titanium carbide, vanadium carbide, zirconium carbide and a mixture thereof.

21. The composite according to claim 19 wherein said ceramic filler phase is comprised of a ceramic nitride selected from the group consisting of hafnium nitride, niobium nitride, silicon nitride, tantalum nitride, titanium nitride, vanadium nitride, zirconium nitride and a mixture thereof.

22. The composite according to claim 19 wherein said ceramic filler phase is comprised of a ceramic boride selected from the group consisting of $HfB_2$, NbB, $NbB_2$, TaB, $TaB_2$, $TiB_2$, VB, $VB_2$, $ZrB_2$ and a mixture thereof.

23. The composite according to claim 19 wherein said composite is comprised of from about 25% by volume to about 65% by volume of said ceramic filler phase, and from about 35% by volume to about 75% by volume of said continuous phase.

24. The composite according to claim 19 wherein said ceramic filler phase is comprised of particles.

25. The composite according to claim 19 wherein said ceramic filler phase is comprised of filaments.

26. The composite according to claim 19 wherein said ceramic filler phase is comprised of a mixture of particles and filaments.

27. The composite according to claim 19 wherein said infiltrant is $CaO.SiO_2$ wherein each oxidic constituent of said $CaO.SiO_2$ ranges up to ±50% from its stoichiometric composition.

28. The composite according to claim 19 wherein said infiltrant is $SrO.SiO_2$ wherein each oxidic constituent of said $SrO.SiO_2$ ranges up to ±50% from its stoichiometric composition.

29. A composite having a porosity of less than about 5% by volume consisting essentially of polycrystalline inorganic filler ranging in amount from about 5% by volume to about 70% by volume of said composite, said filler being free of oxide and silicon nitride fillers, and a continuous interconnecting polycrystalline alkaline earth aluminosilicate matrix phase ranging in amount from about 95% by volume to about 30% by volume of said composite, said matrix phase being distributed through said composite, the thickness of said matrix phase between said filler ranging from about 0.1 micron to about 10 microns, said alkaline earth aluminosilicate phase being represented by the stoichiometric formula $xM'O.yAl_2O_3.zSiO_2$ where M'=Ca, Mg, Sr and a mixture and/or solid solution thereof, where x is 1, 2, 4 or 6, where y is 1, 2, 5 or 9, where z is 1, 2 or 5 and wherein said M'O, $Al_2O_3$ and $SiO_2$ constituent of said stoichiometric formula can range to less than ±10% from said stoichiometric formula, said composite containing an amorphous glassy phase in an amount of less than about 5% by volume of said composite, said composite containing no significant reaction product of said filler and said matrix phase.

30. The composite according to claim 29 wherein said ceramic filler phase is comprised of a ceramic carbide selected from the group consisting of boron carbide, hafnium carbide, niobium carbide, silicon carbide, tantalum carbide, titanium carbide, vanadium carbide, zirconium carbide and a mixture thereof.

31. The composite according to claim 29 wherein said ceramic filler phase is comprised of a ceramic nitride selected from the group consisting of hafnium nitride, niobium nitride, tantalum nitride, titanium nitride, vanadium nitride, zirconium nitride and a mixture thereof.

32. The composite according to claim 29 wherein said ceramic filler phase is comprised of a ceramic boride selected from the group consisting of $HfB_2$, NbB, $NbB_2$, TaB, $TaB_2$, $TiB_2$, VB, $VB_2$, $ZrB_2$ and a mixture thereof.

33. A composite according to claim 29 wherein said composite is comprised of from about 25% by volume to about 65% by volume of said ceramic filler phase, and from about 35% by volume to about 75% by volume of said continuous matrix phase.

34. The composite according to claim 29 wherein said infiltrant is $SrO.Al_2O_3.2SiO_2$ wherein each oxidic constituent of said $SrO.Al_2O_3.2SiO_2$ ranges up to ±50% from its stoichiometric composition.

35. The composite according to claim 29 wherein said ceramic filler phase is comprised of particles.

36. The composite according to claim 29 wherein said ceramic filler phase is comprised of filaments.

37. The composite according to claim 29 wherein said ceramic filler phase is comprised of a mixture of particles and filaments.

38. A composite having a porosity of less than about 10% by volume consisting essentially of polycrystalline inorganic filler ranging in amount from about 5% by volume to about 70% by volume of said composite, said filler being free of oxide filler, and a continuous interconnecting polycrystalline alkaline earth silicate matrix phase ranging in amount from about 95% by volume to about 30% by volume of said composite, said matrix phase being distributed through said composite, the thickness of said matrix phase between said filler ranging from about 0.1 micron to about 10 microns, said alkaline earth silicate phase being selected from the group consisting of CaO.SiO$_2$, SrO.SiO$_2$ and a mixture and/or solid solution thereof wherein said CaO, SrO and SiO$_2$ constituents of said formulas range less than ±10% from said formulas, said composite containing an amorphous glassy phase in an amount of less than about 5% by volume of said composite, said composite containing no significant reaction product of said filler and said matrix phase.

39. A composite having a porosity of less than about 10% by volume consisting essentially of polycrystalline inorganic filler ranging in amount from about 5% by volume to about 70% by volume of said composite, said filler being free of oxide filler, and a continuous interconnecting polycrystalline alkaline earth aluminosilicate matrix phase ranging in amount from about 95% by volume to about 30% by volume of said composite, said matrix phase being distributed through said composite, the thickness of said matrix phase between said filler ranging from about 0.1 micron to about 10 microns, said alkaline earth aluminosilicate phase being represented by the stoichiometric formula SrO.Al$_2$O$_3$.2SiO$_2$ wherein said SrO, Al$_2$O$_3$ and SiO$_2$ constituents of said formula range less than ±10% from said formula, said composite containing an amorphous glassy phase in an amount of less than about 5% by volume of said composite, said composite containing no significant reaction product of said filler and said matrix phase.

* * * * *